Sept. 27, 1927.  F. C. WALTER  1,643,758
BUMPER BRACKET
Filed Jan. 11, 1927   2 Sheets-Sheet 1
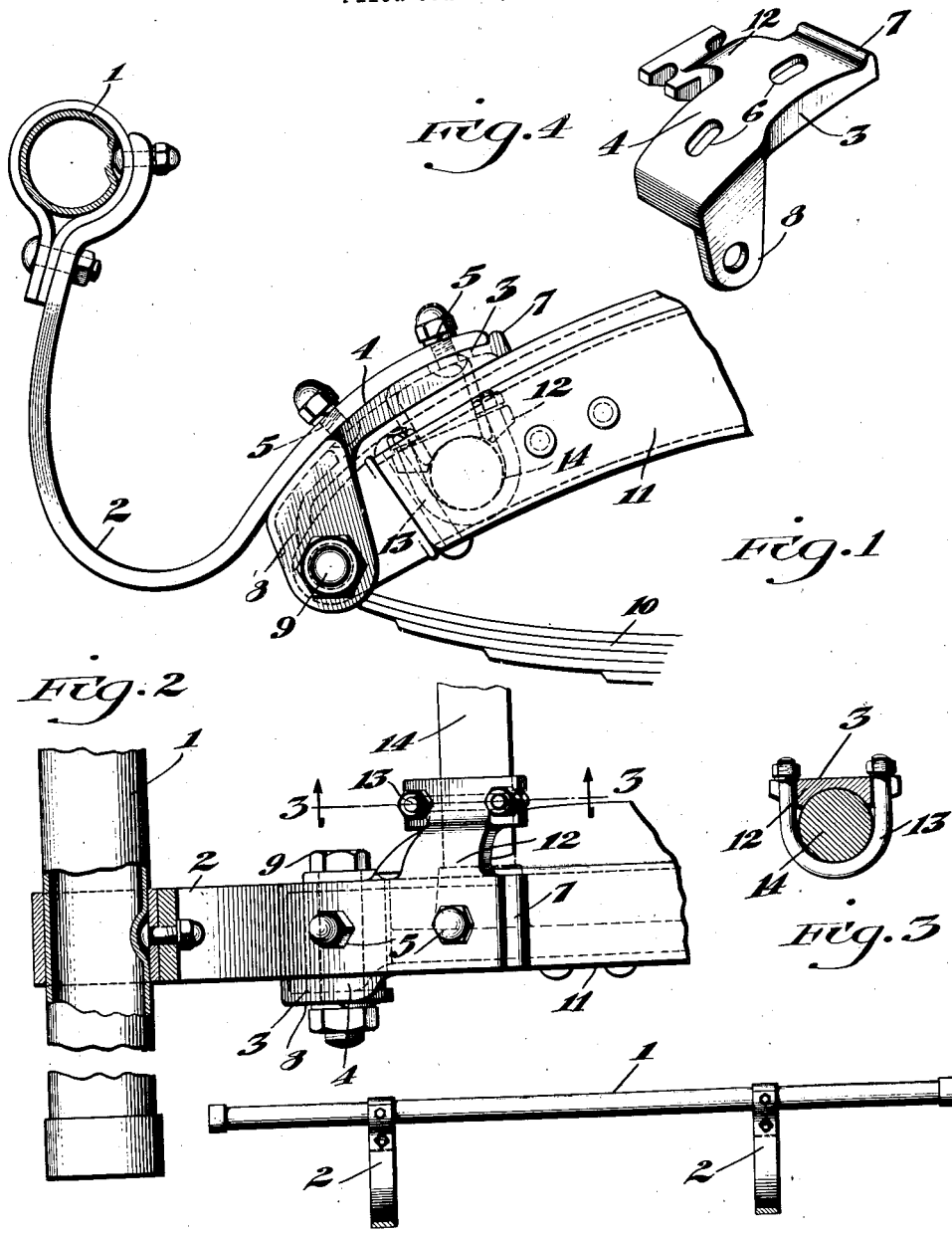
Inventor
Fred C. Walter Sept. 27, 1927.                    F. C. WALTER                    1,643,758
                                  BUMPER BRACKET
                               Filed Jan. 11, 1927            2 Sheets-Sheet 2

Inventor
Fred C. Walter
By Wm. Wink
Attorneys

Patented Sept. 27, 1927.

1,643,758

UNITED STATES PATENT OFFICE.

FRED C. WALTER, OF CINCINNATI, OHIO, ASSIGNOR TO THE CINCINNATI BALL CRANK COMPANY, OF CINCINNATI, OHIO, A CORPORATION OF OHIO.

BUMPER BRACKET.

Application filed January 11, 1927. Serial No. 160,454.

This invention relates to brackets or fixtures for connecting a bumper to a vehicle frame as a shoe interposed between the car frame and attaching end of the bumper for fitting the bumper to various makes of automobiles.

Objects of the invention are to provide a bumper bracket or fixture for conveniently and quickly installing the bumper to the car, a bracket resting on the top of the car frame and furnishing a seat for the attaching end of the bumper which is directly secured to the bracket. The structure of the bracket and its mounting on top of the car frame provide for transmitting horizontal impacts or shocks in an angular direction downwardly on the car frame and car springs, whereby the car springs relieve the bumper or assist in or take up the shocks transmitted and also relieve the bolts or fastening elements securing the parts of the impact strains.

Other objects and certain advantages will be more fully set forth in the description of the accompanying drawings, forming a part of this specification, in which:

Figure 1 is a side elevation of the improved automobile bumper bracket or fixture for securing the bumper to the frame of the vehicle.

Figure 2 is a top plan view thereof.

Figure 3 is a sectional view on line 3—3, Figure 2.

Figure 4 is a perspective view of the bracket or fixture.

Figure 5 is a sectional view taken through the bumper springs and illustrating in elevation a horizontal tubular bumper bar connecting with the free ends of the springs.

Figure 6:
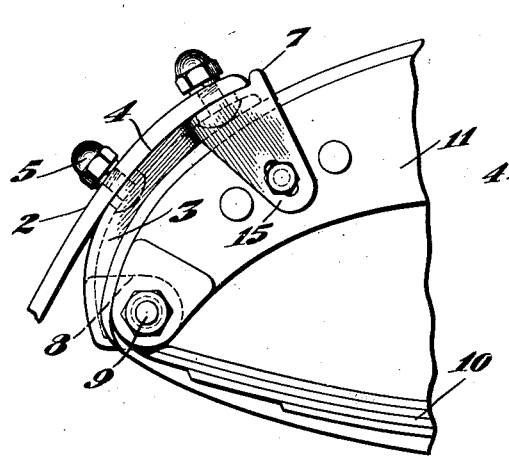
Figure 6 is a side elevation of a modified form of bracket or fixture applied to the vehicle frame.

Figures 8 to 14 inclusive are perspective views of additional modified forms of brackets or fixtures.

The drawings disclose a type of automobile bumper for which the bracket or fixture is particularly adapted. The bumper is of a structure as disclosed in Letters Patent No. 1,465,780 to B. A. Davidson, August 21, 1923, utilizing a relatively non-yieldable impact member, constituting a round tubular bar 1 mounted upon the free ends of a pair of resilient supporting arms or springs 2. The springs are represented as spring metal bars bent approximately to U form with the impact bar secured to the free end of the arm by a split ring clamp bolted to the arm. The opposite end of the arm or spring is slightly curved to substantially seat upon a bracket or fixture 3 to which the present invention is directed. The curved form of seat serves to resist longitudinal movement of the spring arm upon the bracket. The bracket or fixture 3 to meet commercial conditions, is required to be made in various forms or modifications to accommodate for the variations in chassis structure of one make of automobile over another. This makes it difficult to standardize the bracket to a single form.

The different forms herein illustrated cover a range for the principal makes of pleasure cars and preferably for making a front fitting, modifications in some instances being necessary to fit the bracket for a similar bumper on the rear end of the car. Under the prevailing practice, a single bar bumper reaching across the car is utilized for the front end while a pair of bumperettes are substituted for the rear end.

In all forms disclosed, the principal characteristic of the bracket, is in resting upon the top of the vehicle frame and securingly clamping at two or more points, so that under impact, the bracket will bear down on the frame and transmit the shocks from a lateral to an angular direction on the frame, due to the center of the force or impact being above the swivel point of the bracket, thus bringing the car springs into play, thereby assisting the shock absorbing member or bumper spring to absorb the load of the impact. The horizontal load is transmitted into a downward pressure thereby relieving the bolts or fasteners, connecting the bracket to the car frame, so that the car springs take up impact strains. The bracket at one point is secured or fastened to the shackle bolt connecting the vehicle spring to the frame and at a second point directly to the frame or cross member thereof.

The bracket primarily comprises a plate having its upper surface 4 of a curvature corresponding to the curvature of the attaching end of the spring 2 upon which the spring seats and is secured by a pair of bolts 5—5 passing through slots 6—6 in the bracket. The rear end of the bracket is formed with a cross rib or lug 7 extending above the upper or seat surface of the bracket as an abutment for the end of the spring. A lug or ear 8 depends from one side of the plate forming an extension for securing the bracket to a shackle bolt 9 connecting the car spring 10 to the car frame 11. The lug overlaps the side of the frame and establishes one point for connecting the bracket. The brackets are preferably made in rights and lefts in a set, to bring the lug at relative opposite sides of the car provided either at the inside or outside thereof. A lateral arm or lug 12 projects from the bracket at a side opposite the lug 8 which is notched at opposite sides for the reception of a U bolt 13 securing the bracket to a cross bar or member 14 of the car frame. In this form the connections are preferably at opposite sides of the plate but such plan cannot always be followed to fit the bracket to a particular make of car. The arm 12 extends in a horizontal direction and in this capacity differs from the forms shown in Figures 6, 7, 9, 10, 12, 13 and 14 in which the arm depends from the plate. Thus, in Figures 6, 7, 9, 10, 12, 13 and 14 the second point of connection of the bracket to the frame is through a depending lug or ear 15 which may be either on the same or opposite side of the plate from that of the lug 8.

Figure 7:
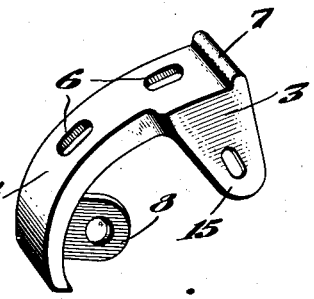
Figure 7 is a perspective view of the fixture shown in Figure 6.
Figure 8:
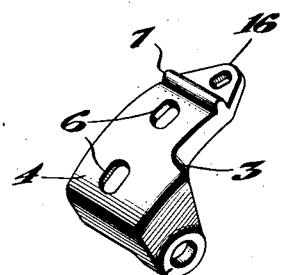
Figure 10:
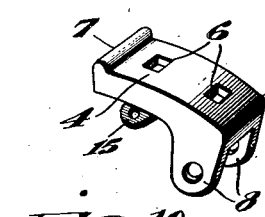
Figure 12:
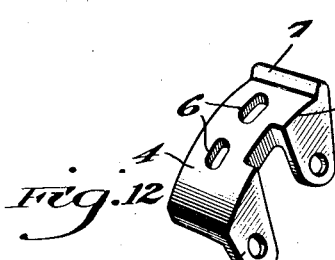
Figure 13:
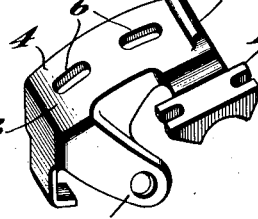
Figure 14:
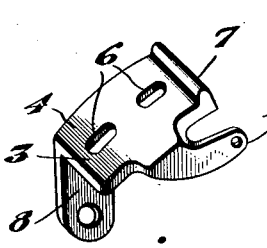

In Figure 10, the bracket is shown with a pair of depending lugs 8 for connection to the shackle bolt while in Figure 8 the second connection is made through a lug 16 extending from the rear end of the plate. In Figure 13 the connection for one or forward end of the plate is made by an angle extension 17 to a front cross member of the car frame by a hook bolt while the second connection is made by means of a lug 15 similar to that in Figures 7, 9, 12 and 14.

Figure 9:
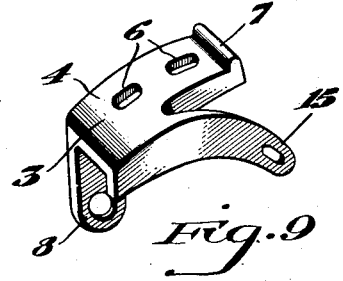
Figure 11:
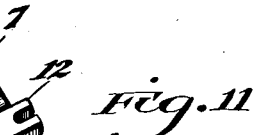

The form as shown in Figures 1 to 4 inclusive represents a Cadillac front fitting. Figures 6 and 7 represent a Buick front fitting. Figure 8 represents a Pierce Arrow front fitting. Figure 9 a Hudson front fitting. Figure 10 a Nash Advanced Six. Figure 11 a Studebaker Big Six. Figure 12 a Chandler. Figure 13 represents a Nash Special Six, and Figure 14 a Willys Knight Six, Model 70.

Having described my invention, I claim:

1. The combination with a vehicle chassis frame and vehicle springs connecting with the ends of the frame at relatively opposite sides thereof of a bumper mounted upon said frame, including, an impact bar and a pair of resilient bars connected at one end to said impact bar and at the opposite end clamped to the vehicle frame, brackets respectively interposed between the frame attaching ends of said resilient bars and the frame, each bracket comprising a plate body resting upon the upper surface of the frame and upon which the end of the resilient bar seats and is secured, and lugs extending from said body providing plural attaching points, one lug connecting directly to the vehicle frame and a second lug connected to the spring bolt connecting the vehicle spring and frame.

2. The combination with a vehicle chassis frame and vehicle springs connecting with the ends of the frame at relatively opposite sides thereof, of a bumper mounted upon said frame, including an impact bar and a pair of resilient bars connected at one end to said impact bar and at the opposite end clamped to the vehicle frame, brackets respectively interposed between the frame attaching ends of said resilient bars and vehicle frame, each bracket comprising a plate body having a crown upon which the end of the resilient bar is secured and a rib at the end thereof to provide an abutment for the end of the resilient bar, and lugs extending from said body providing plural attaching points, one lug connecting directly to the vehicle frame and a second lug connected to the spring bolt connecting the vehicle spring and frame.

3. The combination with a vehicle chassis frame and vehicle springs connecting with the ends of the frame at relatively opposite sides thereof of a bumper mounted upon said frame, including an impact bar and a pair of resilient bars connected at one end to said impact bar and at the opposite end clamped to the vehicle frame, brackets respectively interposed between the frame attaching ends of said resilient bars and vehicle frame, each bracket comprising a plate body upon which the end of the resilient bar is secured, adapted to be secured to the top of the vehicle frame, and having a lug extending from said body at a point for connection to the shackle bolt connecting the vehicle spring and frame, whereby the shocks are transmitted from said bumper to the vehicle springs.

In witness whereof, I hereunto subscribe my name.

FRED C. WALTER.